US005310121A

United States Patent [19]
Nilson et al.

[11] Patent Number: 5,310,121
[45] Date of Patent: May 10, 1994

[54] COLD WEATHER BULK STACKER/RECLAIMER APPARATUS AND METHOD

[75] Inventors: Bengt A. Nilson, Atlanta; Peter J. Zreloff, Alpharetta, both of Ga.

[73] Assignee: Consilium Bulk Babcock Atlanta, Inc., Atlanta, Ga.

[21] Appl. No.: 919,786

[22] Filed: Jul. 24, 1992

[51] Int. Cl.⁵ .............................................. B02C 23/00
[52] U.S. Cl. ..................................... 241/27; 241/235; 241/DIG. 17
[58] Field of Search ................. 241/27, DIG. 17, 235, 241/95

[56] References Cited

U.S. PATENT DOCUMENTS

| | | | |
|---|---|---|---|
| 1,506,907 | 9/1924 | Jackson | 241/DIG. 17 X |
| 2,031,352 | 2/1936 | Wilson | 241/95 X |
| 2,449,132 | 9/1948 | Lucia | 241/DIG. 77 X |
| 2,587,872 | 3/1952 | McLain | 241/DIG. 17 X |
| 2,628,477 | 2/1953 | McLain | 241/DIG. 17 X |
| 2,631,436 | 3/1953 | Faye et al. | 241/DIG. 17 X |
| 2,925,079 | 2/1960 | Saxe | 241/DIG. 17 X |
| 4,244,463 | 1/1981 | Bartley | |
| 4,332,612 | 6/1982 | Hayashi | 241/DIG. 17 X |
| 4,363,396 | 12/1982 | Wolf et al. | |
| 4,535,942 | 8/1985 | Hayashi | 241/DIG. 17 X |
| 5,082,187 | 1/1992 | Kirchoff et al. | 241/95 X |

Primary Examiner—Mark Rosenbaum
Assistant Examiner—Frances Chin
Attorney, Agent, or Firm—Needle & Rosenberg

[57] ABSTRACT

An improvement in a bulk stacker/reclaimer of the type comprising a stacker conveyor for stacking bulk material into a pile, a reclaimer conveyor for removing bulk material from the pile and a removing means for transporting reclaimed material away from the stacker/reclaimer to a remote location. The improvement comprises a breaking means, interposed between the reclaimer conveyor and the removing means, to break apart frozen clumps of bulk material. The inflow to the breaking means is in communication with the discharge of the reclaimer conveyor and the outflow of the removing means is in communication with the breaking means.

5 Claims, 2 Drawing Sheets

COLD WEATHER BULK STACKER/RECLAIMER APPARATUS AND METHOD

BACKGROUND OF THE INVENTION

This invention relates to an apparatus for stacking and reclaiming loose bulk material such as wood chips, and, more particularly, to an improved stacker/reclaimer for use in connection with frozen bulk material.

Heretofore, various devices for stacking and reclaiming loose bulk material have been developed, as, for example, those disclosed in U.S. Pat. Nos. 4,244,463 and 4,363,396.

A basic stacker/reclaimer consists of a central tower which concentrically supports an upper stacker conveyor and a lower reclaimer conveyor. The stacker conveyor adds bulk material to a pile while the reclaimer conveyor removes material from the pile.

Two types of stacker/reclaimers are currently being manufactured, the linear travelling type and the circular slewing type. The circular slewing type produces a doughnut-shaped pile by stacking the bulk material with a stacking device located in the center of the pile. The stacking device pivots at the center of the pile, enabling it to add to any part of the pile.

The use of stacker/reclaimers for materials such as wood chips, bark, wastewood aggregate, minerals, grain, etc. has been limited to non-freezing climates. This restriction is due to the fact that conventional technology cannot handle lumpy or frozen material. As the reclaimer boom scrapes material from the surface of the pile in freezing climates, the icy crust will break up in big clumps. These frozen clumps create jamming problems at the in-feed to the exit chute of the conveyor which takes the bulk material away from the stack.

SUMMARY OF THE INVENTION

The invention is utilized in connection with a conventional stacker/reclaimer of bulk material, including a stacker conveyor for stacking bulk material into a pile, a reclaimer conveyor which removes the bulk material from the pile, and removing means or conveyor to transport reclaimed material away from the stacker/reclaimer to a remote location. In an embodiment for doughnut-shaped piles, there is a central tower which acts as both a structural base and a pivot point.

The present invention is to provide, between the reclaimer conveyor and the removing means, a means to break apart the frozen clumps in the bulk material prior to its being fed into the exit chute.

The stacker/reclaimer may either be of the linear or the circular type. With either type, the breaking means is mounted to move with the removing means and is positioned beneath and adjacent to the discharge end of the removing means. The breaking means includes a frame having an open top and an open bottom. A plurality of axially parallel, horizontally-aligned cylinders with spikes extending radially from their surface are mounted in the frame. Means are provided for rotating the cylinders.

Associated with the breaking means is a wall radially extending from the central tower about the interior of the pile which acts as a means for retaining the bulk material. A flange horizontally projects outwardly from the top end of the wall and over the open top of the frame.

In cold weather, the material is scraped in clumps from the surface of the pile and brought across the flange to drop onto the rotating cylinders which break up the clumps so that the material can be carried away. Because any frozen clumps are broken up by the spike rolls, the removal chute does not get clogged by frozen clumps of bulk material.

DETAILED DESCRIPTION OF THE INVENTION

Figure 1:
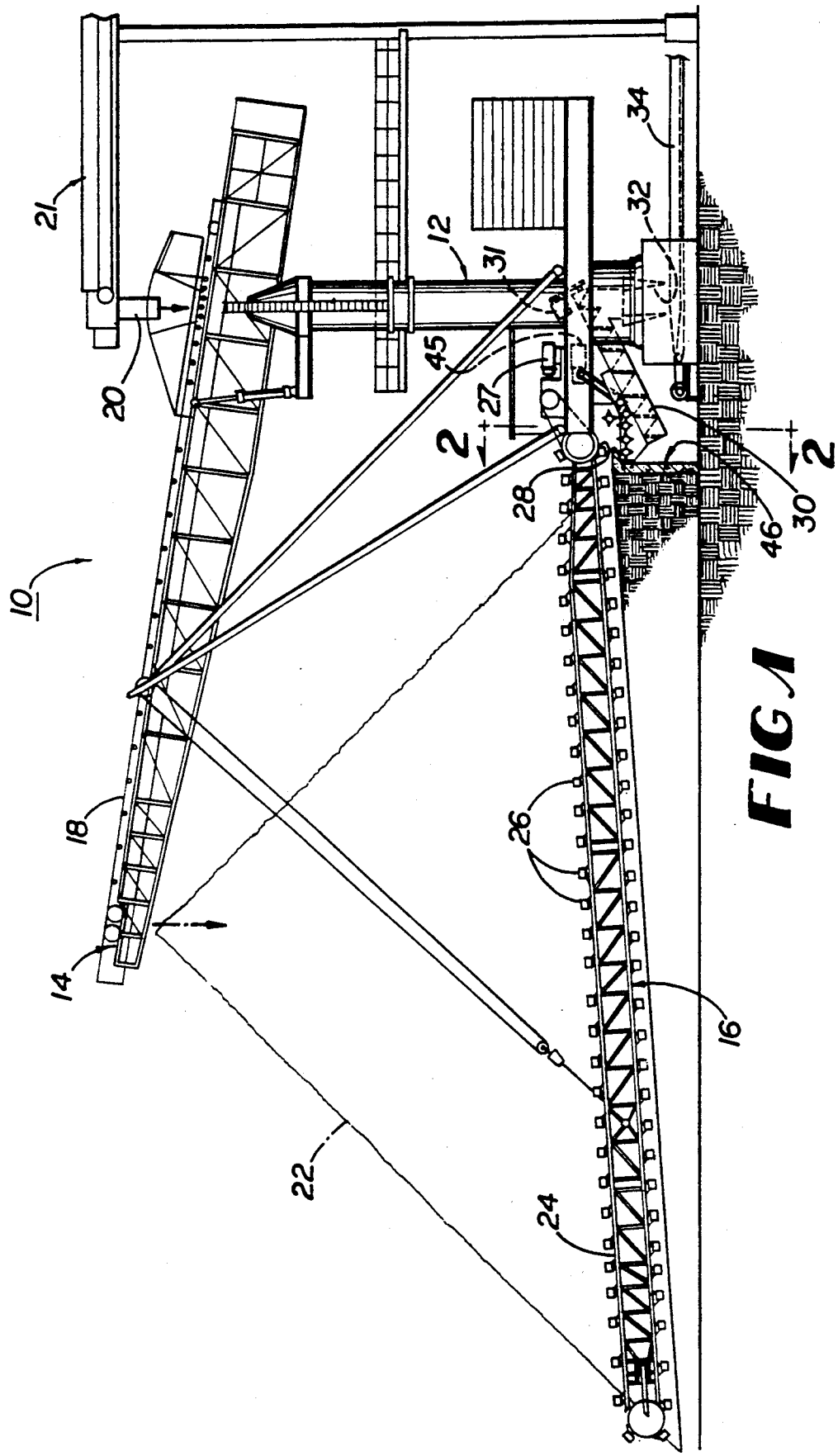
FIG. 1 is a side elevational view of the stacker/reclaimer apparatus of the present invention.

The preferred embodiment of this invention 10, as shown in FIG. 1 in connection with a circular stacker/reclaimer, conventionally comprises a central tower 12, an upper stacker boom 14, and a lower reclaimer boom 16. Both the stacker boom 14 and the reclaimer boom 16 are concentrically mounted on the tower 12 and may be separately rotated thereabout by conventional means (not shown in detail).

Figure 3:
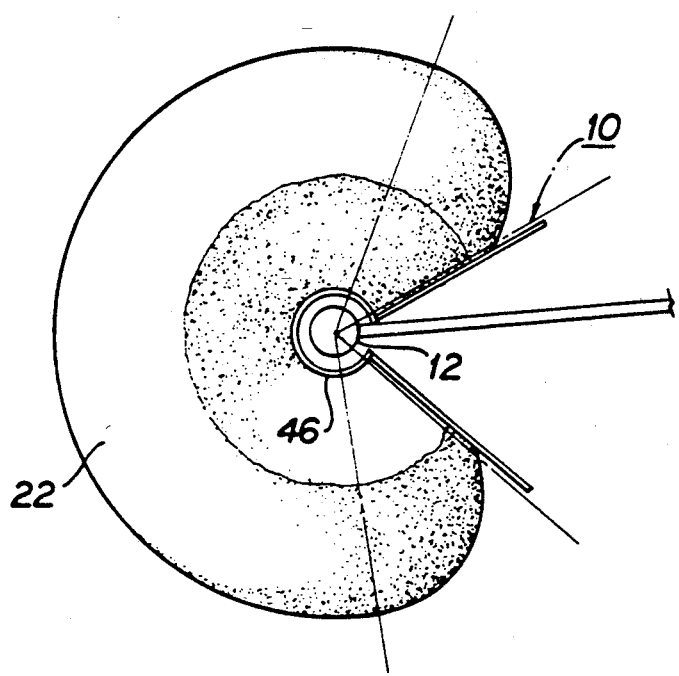
FIG. 3 is a top view of a doughnut-shaped pile containing a schematic view of a stacker/reclaimer.

The stacker boom 14 carries an endless stacking conveyor assembly 18 that receives bulk material from a delivery chute 20 disposed beneath an endless in-feed conveyor assembly 21. The stacking conveyor 18 discharges the bulk material onto a pile 22. The stacker boom 14 can be raised and lowered by conventional means to a height slightly above the top of the pile 22 in order to reduce dust formation. In order to build a complete or partial doughnut-shaped pile, as shown in FIG. 3, the stacking conveyor 18 rotates around the central tower 12.

The filling process starts with the stacker boom 14 in the lowest position. Bulk material is conveyed onto the pile by stacking conveyor 18 and as soon as the pile 22 builds up close to the boom tip, a tilt switch (not shown) will actuate a lifting device (not shown in detail) to lift the boom 14 about three feet. This cycle repeats itself until the maximum desired pile height is reached. Thereafter, each time the tilt switch is actuated, the stacker rotation drive (not shown) will move the boom 14 three feet sideways. This process repeats itself automatically until the storage area is full.

The reclaimer boom 16 consists of a reclaimer conveyor 24 that comprises a plurality of transversely extending scraping claws 26 longitudinally spaced on flights attached to a pair of endless belts or chains which rotate along the length of the boom 16. The conveyor 24 is connected through conventional linkage to motor 27. The claws 26 traveling on the underside of the conveyor 24 drag loose bulk material off of the pile 22 toward the center tower 12.

In the conventional construction of stacker/reclaimers, the scraped material travels towards the rear or discharge end 28 of the conveyor 24 where the material is directed into the base of the central tower 12 wherein it falls through a chute 32 onto an out-feed conveyor 34.

Figure 2:
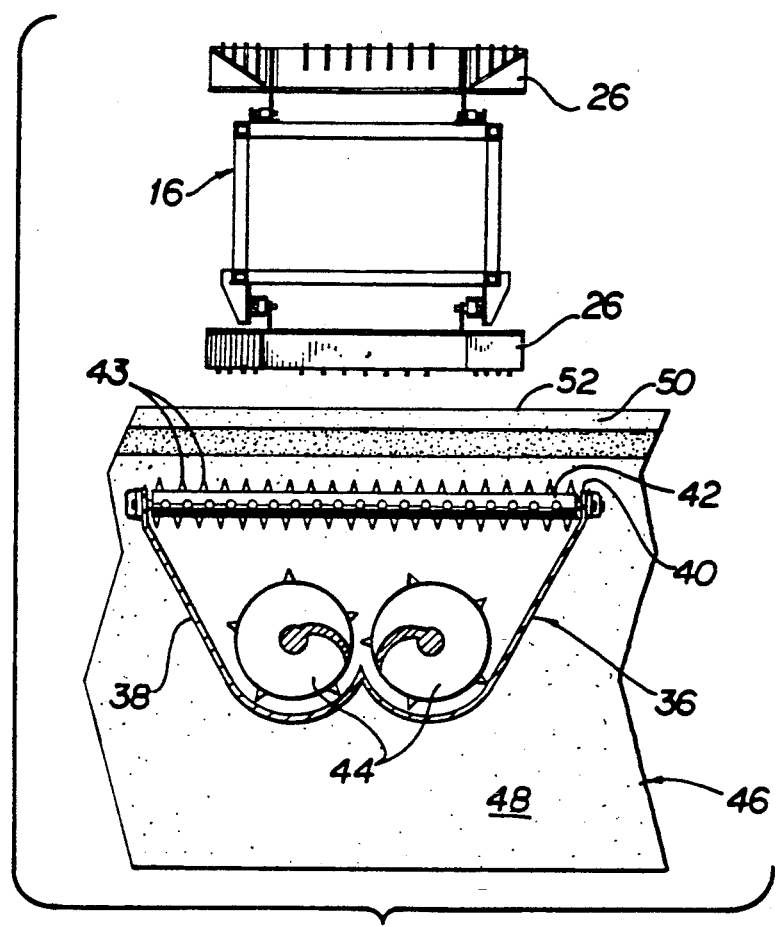
FIG. 2 is a view taken along line 2—2 in FIG. 1.

The present invention interposes a cold-weather bulk material breaking means denoted generally by the numeral 36 between the discharge end 28 of conveyor 24 and the conveyor 30. As seen in FIG. 2, the breaking means 36 includes a frame 38 which has an open top 40 and an open bottom. The frame 38 is mounted so as to move with the conveyors 24, 30.

A plurality of axially aligned, horizontally disposed rollers 42 having a plurality of upwardly directed spikes 43 along their exterior surfaces are mounted adjacent the top 40 of the frame 38. A motor and conventional linkage, generally shown as numeral 45, causes the rollers 42 to rotate. It is understood that other means for breaking up the frozen clumps of bulk material can be provided within the frame 38, such as perforated vibratory screens, crushers or other such process equipment.

The breaking means 36 further comprises a wall 46 that radially extends about the central tower adjacent the interior of the pile 22. The wall 46 includes a vertical face 48 which terminates in a flange 50 which is directed towards the tower 12 and away from the pile 22. The flange 50 extends over the top 40 of the frame 38 and has a flat top surface 52. As shown in FIG. 1, the top surface 52 of the wall 46 provides a means for directing the reclaimed material into the open top 40 of the frame 38 and for allowing the frozen clumps of bulk material to be dropped onto spiked rollers 42, thereby aiding in the disassociation of the clumps. The operation of the reclaiming conveyor 24 is not obstructed by the presence of the wall 46.

The bottom of the frame 38 is positioned over the in-feed area of an upwardly directed screw conveyor 30 which delivers the material to the chute 32. As seen in FIG. 2, the conveyor 30 comprises a pair of oppositely rotating augers 44 which are powered by conventional motor means 31.

It is understood that a wall similar to wall 46 could be utilized in a linear-type stacker/reclaimer system.

What is claimed is:

1. In a bulk material stacker/reclaimer of the type having a central tower and a stacker conveyor for stacking bulk material into a pile and a reclaimer conveyor for removing bulk material from the pile concentrically mounted on the tower for rotation, the reclaimer conveyor having a discharge end, and a removing means for transporting reclaimed material away from the stacker/reclaimer to a remote location, the improvement comprising a breaking means having an open top interposed between the reclaimer conveyor and the removing means to break apart frozen clumps of bulk material, wherein the inflow to the breaking means is in communication with the discharge end of the reclaimer conveyor and the outflow of the breaking means is in communication with the removing means and further comprising a means for directing the discharge from the reclaimer conveyor into the open top of the breaking means, wherein the directing means comprises a wall radially extending from the tower about the interior of the pile of bulk material, the wall having a top end to allow bulk material to fall over the top end of the wall into the breaking means.

2. The stacker/reclaimer of claim 1, wherein said breaking means comprises a frame having an open top and an open bottom and a plurality of axially parallel, horizontally-aligned cylinders with spikes extending radially from their surface mounted in the frame and means for rotating the cylinders, such that frozen clumps of the bulk material are forced between the cylinders and broken apart by the spikes and a conveying means which transports the broken-apart clumps of bulk material to the removing means.

3. The stacker/reclaimer of claim 1, wherein the pile is doughnut-shape with the stacker conveyor and the reclaimer conveyor concentrically mounted on, and separately pivotable about, a central fixed tower, the improvement further comprising:

the breaking means being mounted under the discharge end of the reclaimer conveyor and movable therewith.

4. The stacker/reclaimer of claim 3, wherein a flange horizontally projects outwardly from the tope end of the wall and is positioned over the opening of the breaking means to allow bulk material to fall into the breaking means.

5. In a method for stacking and reclaiming bulk material, of the type wherein bulk material is stacked in a pile by a stacker conveyor, reclaimed from the pile by a reclaimer conveyor and transported away from the pile by a removal means, the improvement comprising the step of directing material discharged from the reclaimer conveyor over a wall extending about the interior of the pile of bulk material into a breaking means which is in communication with the removal means for breaking up frozen clumps of the bulk material.

* * * * *